United States Patent Office 2,827,175
Patented Mar. 18, 1958

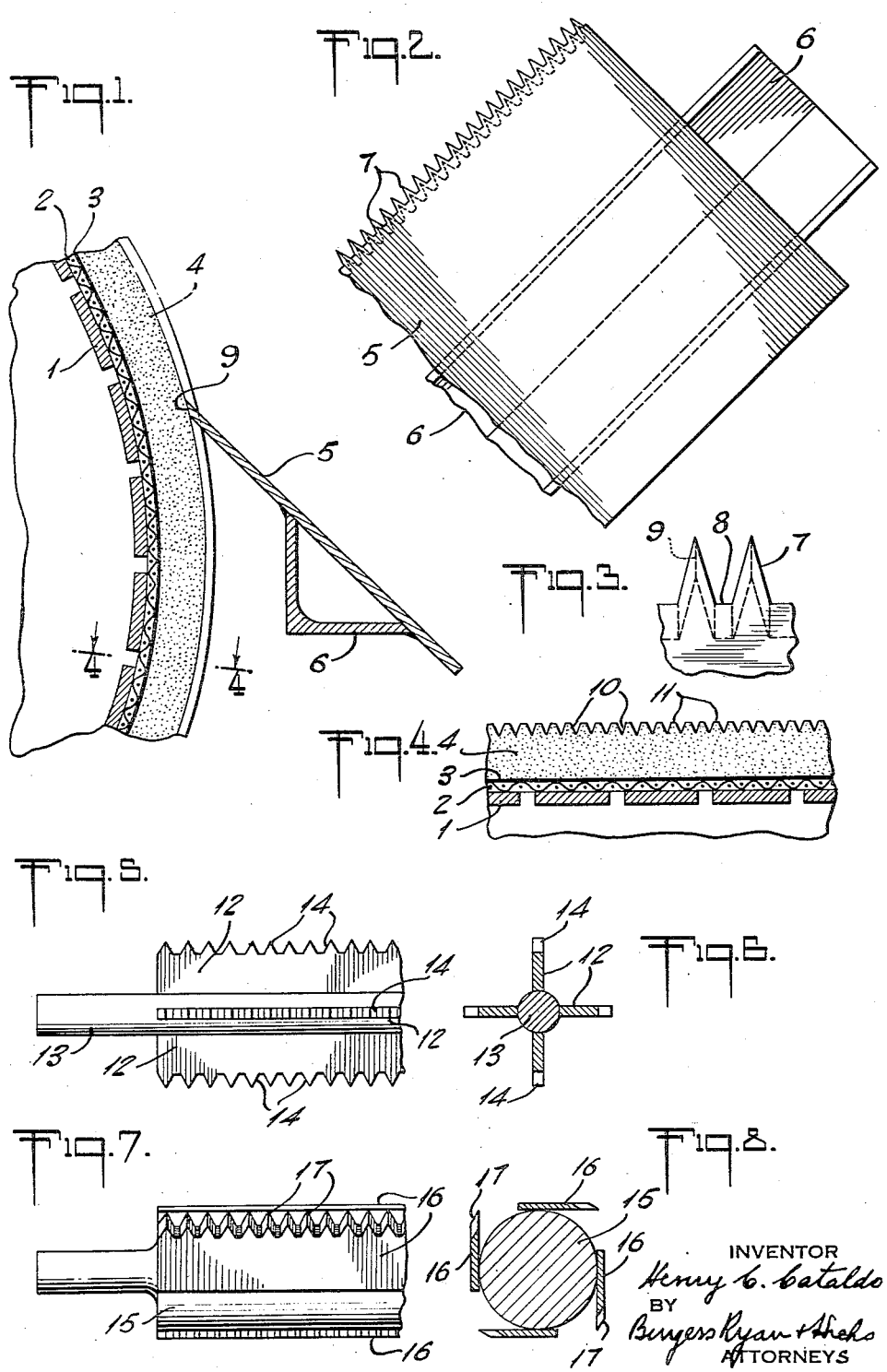

2,827,175

METHOD AND MEANS FOR INCREASING THE CAPACITY OF A PRECOAT FILTER

Henry C. Cataldo, Springfield, N. J., assignor, by mesne assignments, to American Machine and Metals, Inc., New York, N. Y., a corporation of Delaware Application February 24, 1955, Serial No. 490,205

5 Claims. (Cl. 210—396)

This invention relates to filters of the type in which solids are removed from a slurry by causing it to pass, usually under pressure or suction, through a cake of filter material, termed a precoat, applied to a supporting structure, such as a rotary drum or turntable. As the pores of the precoat fill up with sludge, it is necessary to scrape or peel off layers from what will be referred to as the outer surface of the precoat (meaning the surface on which the sludge tends to build up) so that a fresh or unclogged surface is more or less continuously available.

The object of the invention is to provide a method and means for increasing the capacity of such filters, which object is accomplished, in general, by producing and maintaining undulations in the outer surface of the precoat.

In the accompanying drawings the invention is illustrated, by way of example, in connection with a rotary drum type filter.

In these drawings:

Fig. 1 is a vertical section of a portion of a precoat filter drum with one form of the invention applied to it;

Fig. 2 is a plan view of the form of knife incorporated in Fig. 1;

Fig. 3 is an enlarged view of two of the teeth of the knife of Fig. 2;

Fig. 4 is a section on the line 4—4 of Fig. 1;

Figs. 5 and 6 are an elevation and cross-section, respectively, of a modified form of knife; and Figs. 7 and 8 are an elevation and cross-section, respectively, of another form of knife.

The filter is shown as consisting of a perforated drum 1, the surface of which has a covering of open mesh wire cloth 2 and, over that, a filter cloth 3. Applied to and built up on the filter cloth is the precoat 4.

In the preferred applications of the invention the undulating precoat surface to be produced and maintained takes the form of a series of closely spaced grooves. In the Fig. 1 form these grooves are made by the serrated edge of a knife positioned and adapted to engage the outer surface of the precoat. As shown, the knife 5, suitably supported, as at 6, has its precoat-engaging edge formed with a plurality of closely spaced teeth 7. As shown enlarged in Fig. 3, the teeth are pointed at their free ends and spaced by flat-bottomed valleys 8. The under sides of the teeth, that is, the sides toward the precoat, are bevelled to define a groove-forming ridge 9 and minimize any tendency of the points to bore directly into the precoat.

The filter and knife, of course, are adapted for relative movement, in this instance by the rotation of the drum in relation to the stationary knife. Filters of this general type being well known, no further description of the operation will be necessary. It will be apparent that the knife serves to form a series of closely spaced grooves 10 in the outer surface of the precoat, of a form complementary to that of the teeth.

In the operation of filters of this general type, the flow is determined initially by the thickness of the precoat but, when the sludge begins to build up, the flow is determined by the surface area or surface resistance. Accordingly, the capacity of the filter for any given set of conditions is materially increased by increasing the area of the outer surface of the precoat as, it will be seen, is accomplished by grooving that surface as described. It will be recognized that the flat surfaces 11 between the precoat grooves are desirable not only from the point of view of capacity but also in that the flat-ended "teeth" of the precoat section are less liable to damage or disintegration than sharp pointed "teeth" would be. The grooved surface is maintained, of course, by advancing the knife into the precoat in the usual manner.

Figs. 5 to 8 illustrate rotary rather than stationary knives but the operation and effect will be seen to be the same. In Figs. 5 and 6 there are four knives 12 projecting radially from a shaft 13, each knife having a serrated edge 14 for engaging and grooving the precoat. In Figs. 7 and 8, the shaft 15 carries four tangentially disposed blades 16, each similarly provided with a serrated edge 17.

In the light of the foregoing exemplifications of the principles of the invention, the following is claimed:

1. The combination with a filter having a precoat applied thereto of knife means having an edge adapted to engage the outer surface of the precoat, the precoat-engaging edge of the knife being serrated.

2. The combination with a rotary filter having a precoat applied thereto of a stationary knife having a serrated edge positioned to engage and groove the outer surface of the precoat as the filter rotates.

3. The combination with a filter having a precoat applied thereto of knife means having an edge adapted to engage the outer surface of the precoat, the precoat and knife member being relatively movable and the precoat-engaging edge of the knife being serrated, whereby to groove the said precoat surface.

4. The combination with a filter having a precoat applied thereto of knife means having an edge adapted to engage the outer surface of the precoat, the precoat-engaging edge of the knife member comprising a series of pointed teeth spaced by flat-bottomed valleys.

5. The combination with a filter having a precoat applied thereto of knife means having an edge adapted to engage the outer surface of the precoat, the precoat-engaging edge of the knife member comprising a series of pointed teeth bevelled on the under sides to define a groove-forming ridge.

References Cited in the file of this patent

UNITED STATES PATENTS

| | | |
|---|---|---|
| 1,773,476 | Chamberlain | Aug. 9, 1930 |
| 1,880,005 | Wright et al. | Sept. 27, 1932 |
| 2,265,386 | McBerty et al. | Dec. 9, 1941 |
| 2,371,417 | Wright | Mar. 13, 1945 |

FOREIGN PATENTS

| | | |
|---|---|---|
| 671,703 | Germany | Feb. 13, 1939 |
| 696,675 | Germany | Sept. 26, 1940 |
| 893,641 | Germany | Oct. 19, 1953 |